United States Patent
Liu et al.

(10) Patent No.: US 12,306,876 B2
(45) Date of Patent: May 20, 2025

(54) METHOD OF PROCESSING AN OBSERVATION INFORMATION, ELECTRONIC DEVICE AND STORAGE MEDIUM

(71) Applicant: Beijing Baidu Netcom Science Technology Co., Ltd., Beijing (CN)

(72) Inventors: Chang Liu, Beijing (CN); Wei Liu, Beijing (CN); Qian Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 21 days.

(21) Appl. No.: 18/157,470

(22) Filed: Jan. 20, 2023

(65) Prior Publication Data

US 2023/0153357 A1 May 18, 2023

(30) Foreign Application Priority Data

Jan. 21, 2022 (CN) .......................... 202210076944.1

(51) Int. Cl.
*G06F 16/00* (2019.01)
*G06F 16/903* (2019.01)

(52) U.S. Cl.
CPC .............................. *G06F 16/90335* (2019.01)

(58) Field of Classification Search
CPC ......... G06F 16/90335; G06F 16/24553; G06F 16/9535; G06F 16/31; G06F 16/9538; G06F 40/247; G06F 40/289
See application file for complete search history.

(56) References Cited

U.S. PATENT DOCUMENTS

| 10,747,792 B2 | 8/2020 | Quyang | |
| 2014/0289236 A1* | 9/2014 | Agarwal | G06F 16/3334 707/725 |
| 2014/0330818 A1* | 11/2014 | Raina | G06Q 50/01 707/723 |
| 2016/0350379 A1 | 12/2016 | Bank et al. | |

(Continued)

FOREIGN PATENT DOCUMENTS

| CN | 102004775 | 4/2011 |
| CN | 102117320 | 7/2011 |
| CN | 102368264 | 3/2012 |

(Continued)

OTHER PUBLICATIONS

Herschel et al., "A survey on provenance: What for? What form? What from?", The VLDB Journal (2017), vol. 26, pp. 881-906.

(Continued)

*Primary Examiner* — Paul Kim
(74) *Attorney, Agent, or Firm* — HSML P.C.

(57) ABSTRACT

A method of processing an observation information, an electronic device and a storage medium are provided, which are related to a field of data processing technology, in particular to fields of intelligent searching, cloud computing and big data. The method includes: obtaining the observation information generated in a process of processing a query request; determining a scene identification corresponding to the observation information; and outputting the observation information to a corresponding target position for storage according to the scene identification.

13 Claims, 3 Drawing Sheets

(56) References Cited

U.S. PATENT DOCUMENTS

2017/0255681 A1* 9/2017 Giunio-Zorkin ....... G06Q 50/01

FOREIGN PATENT DOCUMENTS

| | | |
|---|---|---|
| CN | 102945125 | 2/2013 |
| CN | 102957742 | 3/2013 |
| CN | 105045901 | 11/2015 |
| CN | 109257259 | 1/2019 |
| CN | 109344165 | 2/2019 |
| CN | 110020101 | 7/2019 |
| CN | 112131611 | 12/2020 |
| CN | 13360689 | 9/2021 |
| JP | 10-207906 | 8/1998 |
| JP | 2006-185187 | 7/2006 |

OTHER PUBLICATIONS

Gathani et al., "Debugging Database Queries: A Survey of Tools, Techniques, and Users", CHI 2020 Paper, Apr. 25-30, 16 pages.
Wikipedia, "Cache (computing)", Feb. 2, 2023, 8 pages.
Bluesky, "Msyql log classification, storage, and slow query logs", Jul. 10, 2020, 9 pages with translation available at https://www.zhihu.com/people/bluesky-85-21.
First Japanese Office Action, issued in the corresponding Japanese Patent Application No. 2022-181062, dated Jan. 9, 2024, 9 pages.

* cited by examiner

METHOD OF PROCESSING AN OBSERVATION INFORMATION, ELECTRONIC DEVICE AND STORAGE MEDIUM

CROSS-REFERENCE TO RELATED APPLICATIONS

This application is claims priority to Chinese Application No. 202210076944.1 filed on Jan. 21, 2022, which is incorporated herein by reference in its entirety.

TECHNICAL FIELD

The present disclosure relates to a field of data processing technology, in particular to fields of intelligent searching, cloud computing and big data, and more specifically, to a method of processing an observation information, an electronic device, and a storage medium.

BACKGROUND

A query system such as a searching system or a recommendation system may filter out a result with high relevance to a query request from a massive candidate set. Maintenance personnel of the query system need to collect an observation information generated by the query system in a process of processing a query request, and determine a problem of a retrieval system according to the observation information. For example, according to the observation information, it is possible to determine whether the query system is proper to the process of processing the query request, determine how to optimize the process of processing the query request, and determine a reason why data is not returned to users normally, and so on.

SUMMARY

The present disclosure provides a method of processing an observation infoimation, an electronic device, and a storage medium.

According to one aspect of the present disclosure, there is provided a method of processing an observation information, including: obtaining the observation information generated in a process of processing a query request; determining a scene identification corresponding to the observation information; and outputting the observation information to a corresponding target position for storage, according to the scene identification.

According to another aspect of the present disclosure, there is provided an electronic device including: at least one processor; and a memory communicatively coupled with at least one processor; wherein the memory stores instructions executable by at least one processor, and the instructions, when executed by at least one processor, cause the at least one processor to implement the method provided by the present disclosure.

According to another aspect of the present disclosure, there is provided a non-transitory computer readable storage medium storing computer instructions, wherein the computer instructions are configured to cause a computer to implement the method provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
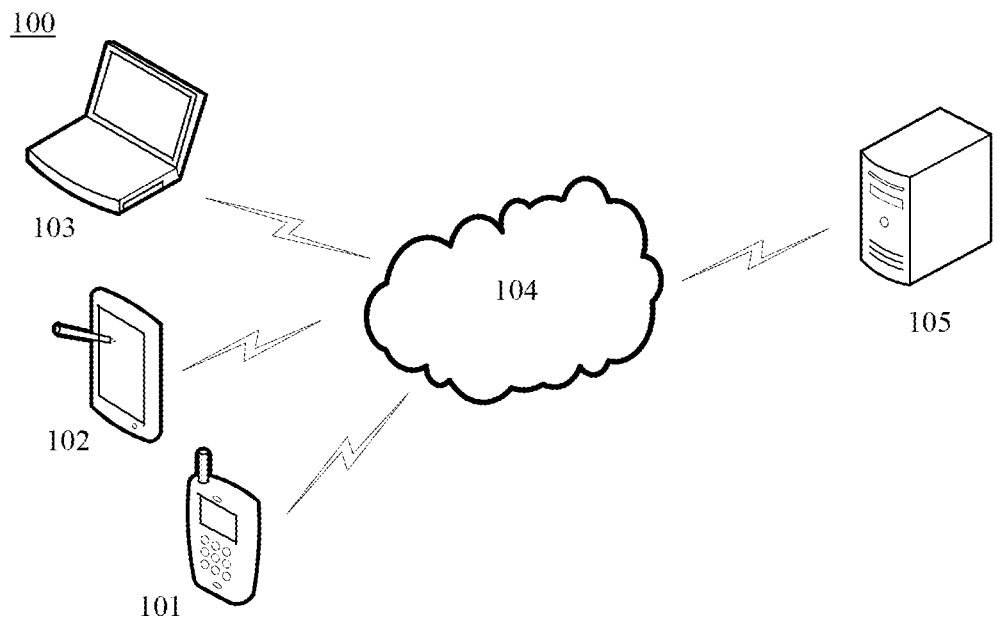
FIG. 1 is a schematic diagram of scenario in which a method and an apparatus of processing an observation infoiiiiation according to an embodiment of the present disclosure are applied.

FIG. 1 is a schematic diagram of an application scenario of a method and an apparatus of processing an observation information according to an embodiment of the present disclosure.

It should be noted that FIG. 1 is only an example of the system architecture to which the embodiments of the present disclosure may be applied to help those skilled in the art understand the technical content of the present disclosure, but it does not mean that the embodiments of the present disclosure may not be applied to other devices, systems, environments or scenarios.

As shown in FIG. 1, a system architecture 100 according to the embodiment may include terminal devices 101, 102 and 103, a network 104, and a server 105. The network 104 is a medium used to provide a communication link between the terminal devices 101, 102 and 103 and the server 105. The network 104 may include various connection types, such as wired and/or wireless communication links, and the like.

The user may use the terminal devices 101, 102 and 103 to interact with the server 105 through the network 104 to receive or send messages, etc. The terminal devices 101, 102 and 103 may be various electronic devices having a display screen and supporting web browsing, including but not limited to smart phones, tablet computers, laptop computers, desktop computers, and the like.

The server 105 may be a server that provides various services, such as a background management server (only for example) that provides support for websites browsed by users using the terminal devices 101, 102 and 103. The background management server may analyze and process the received user request and other data, and feedback the processing results (such as an observation information generated according to the user request) to the terminal equipment.

It should be noted that the method of processing an observation information provided in the embodiments of the present disclosure may generally be executed by the server 105. Accordingly, the apparatus of processing an observation information provided in the embodiments of the present disclosure may generally be provided in the server 105. It is also possible that the method of processing an observation information provided in the embodiments of the present disclosure is executed by a server or a server cluster that is different from the server 105 and may communicate with the terminal devices 101, 102 and 103 and/or the server 105. Accordingly, the apparatus of processing an observation information provided in the embodiments of the present disclosure may be provided in a server or server cluster different from the server 105 and capable of communicating with the terminal devices 101, 102 and 103 and/or the server 105.

It should be understood that the number of terminal devices, networks and servers in FIG. 1 is only schematic. There may be any number of clients, networks and servers as desired in practice.

Figure 2:
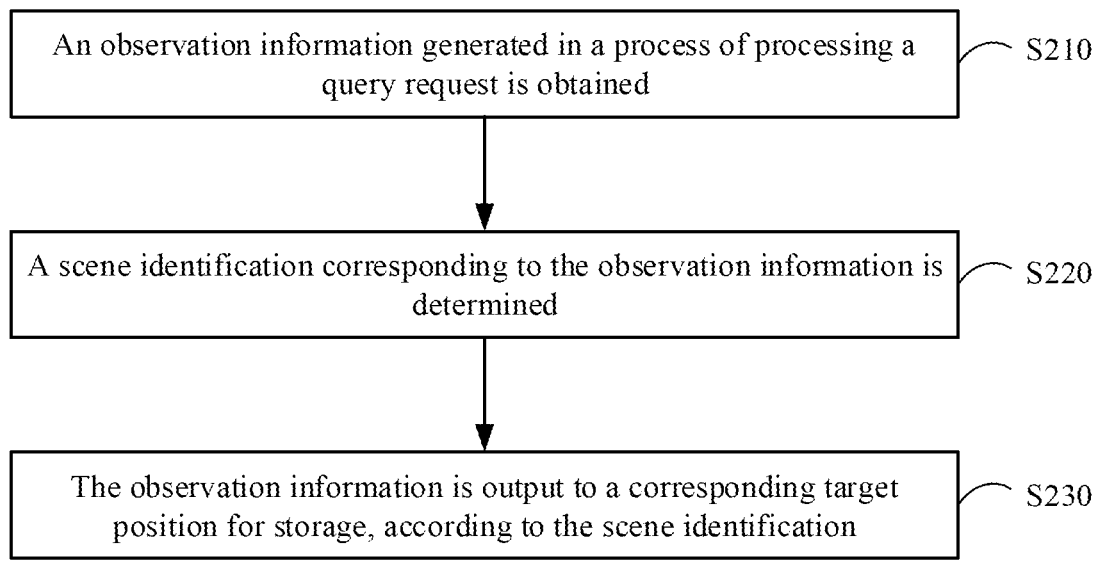
FIG. 2 is a schematic flowchart of a method of processing an observation information according to an embodiment of the present disclosure.

FIG. 2 is a schematic flowchart of a method of processing an observation information according to an embodiment of the present disclosure.

As shown in FIG. 2, the method 200 of processing an observation information may include operations S210 to S230.

In operation S210, an observation information generated in a process of processing a query request is obtained.

After receiving a query request, a query system such as a searching system or a recommendation system processes the query request, filters out data with high relevance to the query request from a database according to the query request, and then returns the filtered out data to a sender of the query request.

The process of processing the query request by the query system may include a plurality of stages, such as a preprocessing stage, a recall stage, a ranking stage, etc. Accordingly, the query system may include a preprocessing module, a recall module, a ranking module, etc. to achieve respective stages. Each module may include a plurality of processing units. For example, the preprocessing module may include processing units such as a word segmentation unit and a synonym conversion unit. The recall module may include processing units such as a keyword matching unit and an evaluation value calculating unit. The ranking module may include a processing unit such as an evaluation value calculating unit. The modules and the processing units may be software modules configured to realize processing functions.

The observation information refers to an information generated by various processing units in the query system in the process of processing the query request. The observation information is used to record a processing result of various processing units for the query request. The processing of the candidate data in a query process, for example, an evaluation of a candidate set in a recall stage, may be determined by using the observation information, so as to determine a reason for data being recalled, being displayed to the user, or being filtered, etc. In an example, it is possible to determine the words into which a query text is divided, according to the observation information of a word segmentation processing unit. For example, the expression "observation unit" is divided into two words "observation" and "unit". For example, it is possible to determine the synonyms to which the query text is converted, according to the observation information of a synonym conversion processing unit. For example, "observation" is converted to "observe".

In operation S220, a scene identification corresponding to the observation information is determined.

In an example, a scenario may include a user usage scenario. For example, many users use the query system to query contents they are interested in. The query request entered by the user may trigger a generation and a recording of the observation information. The situation of querying an information by the user may be the user usage scenario. The observation information generated in the user usage scenario may include a summary processing information, and the amount of the observation information is small. If a query result of the query request is abnormal, e.g. if no result is returned, the processing stage in which the query system has a problem may be determined by using the observation information.

In another example, the scenario may include a business observation scenario. For example, the business side may use the query system to query a specific document, and then determine whether the document is recalled according to the query result. The observation information generated in the business observation scenario may include a summary processing information. The amount of the observation information is small, for example, a storage space occupied by the observation information is about tens of kilobytes. If the document is not recalled normally, the processing stage in which the query system has a problem may be determined by using the observation information.

In another example, the scenario may include a strategy observation scenario. Maintenance personnel of the query system may use the query system to determine the reason why the query request fails to be recalled normally, or optimize an operation strategy of various processing units in the query system. The observation information generated in the strategy observation scenario may include detail processing information. For example, after using the observation information in the user usage scenario or the business observation scenario to locate a stage having a problem, more detailed observation information in the strategy observation scenario may be used to, for a query request of the user and a specific stage having a problem, determine a specific reason of the problem in this stage. The amount of observation information in the strategy observation scenario is large, for example, the storage space occupied by the observation information is about tens of MB to hundreds of GB.

Exemplarily, a mapping relationship between a scene identification and the observation information may be defined in advance, and then the scene identification may be determined according to the mapping relationship. For example, after generating the observation information, a predetermined interface module, which includes the mapping relationship between the scene identification and the observation information, may be called. Then, the scene identification of the current observation information may be determined according to the mapping relationship. The same observation information may be mapped to one or more scene identifications.

In operation S230, the observation information is output to a corresponding target position for storage, according to the scene identification.

In an example, in response of determining that the scene identification is a first scene identification, the observation information may be output to a local position. The first scenario may include at least one of the above user usage scenario and the above business observation scenario. A storage medium for storing observation infoimation may include at least one of a cache and a log file. When the observation infoimation is stored to the local position, the observation information is organized into JSON (JavaScript Object Notation) format.

According to the technical solution provided by the embodiments of the present disclosure, the observation information with a small amount of data is stored to the local position. When it is desired to determine the problems existing in the query system, the observation information may be simply and quickly retrieved from the local position, thus improving an efficiency of troubleshooting. In addition, compared with using a remote distributed database to store the observation information, a storage cost of observation information may be reduced.

In another example, in response of determining that the scene identification is a second scene identification, the observation information may be output to a remote data storage area. The second scenario may include the above strategy observation scenario. The data storage area may include a distributed data storage system has a data retrieval function, such as Elastic Search (a full-text search engine) or MySQL (My Structured Query Language, a relational database management system).

Optionally, in a case that the observation info mation has a hierarchical relationship, indexes may be set for the observation information at different levels. For example, the hierarchical relationship may include a parent-child relationship and a sibling relationship. The parent-child relationship and the sibling relationship may be illustrated by taking a ranking stage as an example: an evaluation value may be calculated based on a plurality of factors such as a basic relevance and clicks, and then a ranking is performed based on the evaluation value. The relationship between the ranking and the basic relevance is a parent-child relationship, and the relationship between the basic relevance and a click rate is a sibling relationship.

According to the technical solution of the embodiments of the present disclosure, the observation information with a large amount of data may be stored in the remote data storage area to avoid the observation information occupying local memory. In addition, the observation information may also be indexed, so that a required observation information may be filtered out from the data storage area by using a plurality of indexes, to improve the ability of filtering the observation information, and thus improving an efficiency of problem tracking and effect analysis.

According to the technical solution provided by the embodiments of the present disclosure, the observation information is provided with the scene identification, and the observation information in different scenes is differentiated according to the scene identification, for example, the observation information is output to the corresponding target position for storage. Therefore, this technical solution may increase a scope of observation application, support different observation scenarios, and meet the observation requirements of different users.

According to another embodiment of the present disclosure, the method of processing an observation information may further include following operation: adjusting, in response to receiving a control signal, the process of processing the query request according to the control signal.

In an example, the processing unit of the query system, when running, may read the control signal, and then adjust a processing strategy according to the control signal. For example, a word segmentation rule for the query request in a preprocessing phase is adjusted to change a result of word segmentation of a query text. For example, a synonym conversion rule for the query request in the preprocessing phase is adjusted to change a result of synonym conversion of the query text. For example, a keyword matching rule is adjusted in a recall stage to change a recall result of the candidate set. For example, when calculating the evaluation value, a weight applied to each factor is adjusted according to the actual application scenario, thus affecting a calculated evaluation value.

In another example, the control signal may be configured to adjust a scheduling process of the modules in the query system. For example, the modules in the query system may include a first module (such as a recall module above) and a second module (such as a ranking module above). To ensure disaster tolerance, the second module may have a plurality of copies. The first module may call a copy copy1 of the second module. In a case that the copy copy1 is abnormal, a target call address of the first module may be adjusted, so that the first module calls another copy copy2 of the second module, to ensure an availability of the first module. For example, if the data or strategy running process of a copy copy3 of the second module is different from the data or strategy running process of other copies, the target call address of the first module may be adjusted to cause the first module to call the copy copy3, to determine the problem of the copy copy3. For example, a timeout parameter of the modules may be adjusted.

In another example, the control signal may adjust a cache strategy. For example, some processing units require a large computing resource. By using the control signal, it is possible to cause the processing units to do some caching before performing processing operations through, or directly perform processing operations without caching.

In one technical solution, when a processing strategy of each processing unit of the retrieval system needs to be optimized, the processing strategy of the processing unit may be adjusted by modifying code. Then, a version of the query system may be updated, a new version of the query system will be published online, and then the observation information of the new version of the query system is obtained.

According to the technical solution provided by the embodiments of the present disclosure, dynamic adjustment is performed by using the control signal, thereby interfering with an operation process of the query system. In optimizing the processing strategy of the retrieval system, the observation information obtained before the processing with the control signal may be compared with the observation information obtained after the processing with the control signal, to analyze an optimization effect. There is no need to reissue the new version of the query system, so as to improve the efficiency of problem tracking and effect analysis.

According to another embodiment of the present disclosure, the method of processing the observation information may further include following operation: setting an index for the observation information, so as to search for the observation information in the data storage area according to the index.

In an example, when creating an observation unit, the observation unit has a basic attribute, which may be set as an index, such as a name of the observation unit, an introduction of the observation unit, or the like.

In another example, in a case that a plug-in for scene management reads a predetermined key name of the observation information, the observation information may be parsed and indexed.

According to the embodiments of the present disclosure, the type of index is not limited. For example, a type of index may include a stage identification, a processing module identification, an user identification, a trademark identification, etc. When searching for the observation information in the data storage area, an index may be taken as a filtering condition and a plurality of indexes may be used to filter the observation information. For example, the observation information, which is located in a predetermined queue at the recall stage and located in a predetermined position at the ranking stage, is filtered out from the obtained pieces of observation information.

According to the embodiments of the present disclosure, multiple types of indexes are set for the observation information. The observation information may be filtered according to the plurality of indexes to achieve the effect of multidimensional filtering of observation information. Compared with a method of filtering observation information with a single index, it may reduce the amount of the filtered out observation information, so that it is convenient for the maintenance personnel of the query system to analyze the problems existing in the query system.

Figure 3:
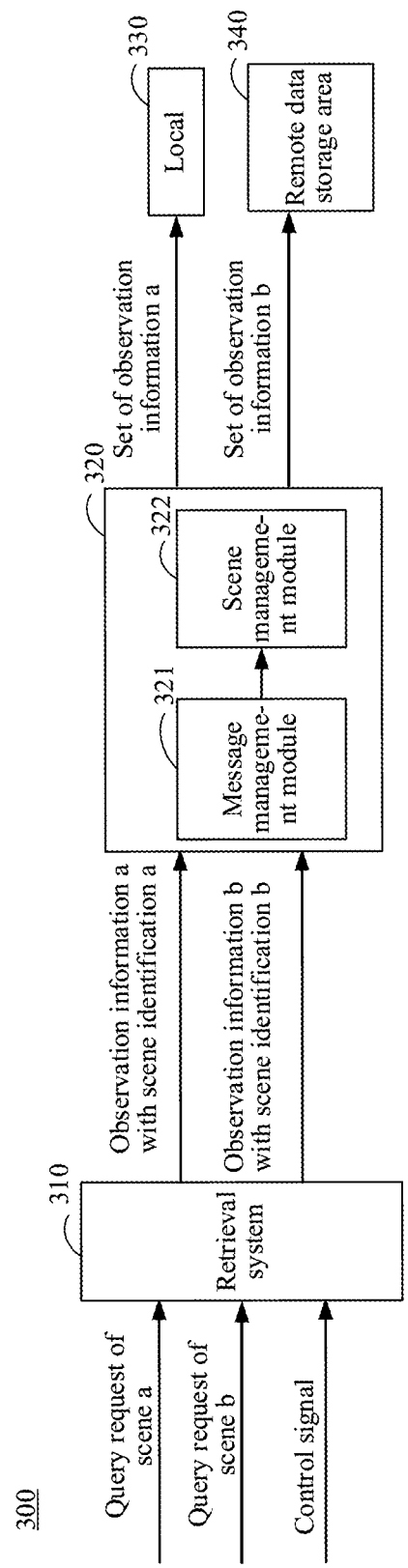
FIG. 3 is a schematic diagram of a method of processing an observation information according to an embodiment of the present disclosure.

FIG. 3 is a schematic diagram of a method of processing an observation information according to an embodiment of the present disclosure.

As shown in FIG. 3, the system 300 may include a retrieval system 310 and an observation system 320, which may be integrated in one server or in different servers.

The retrieval system 310 includes a plurality of processing stages, such as a preprocessing stage, a recall stage, a ranking stage, etc., and each stage includes a plurality of processing units. After the retrieval system 310 receives the query requests in various scenarios, the processing unit processes the retrieval request according to the processing strategy. The processing unit will generate a plurality of observation information in a process of processing the query request. For example, the retrieval system 310 processes a received query request of a scene a and generates multiple pieces of observation information a. The retrieval system 310 processes a received query request of scene b and generates multiple pieces of observation information b.

The processing unit of the retrieval system 310 may call an interface of the observation system 320. The observation system 320 may pre-store a mapping relationship between an observation message and a scene identification. After receiving a call request, the observation system 320 provides a pre-defined scene identification corresponding to the observation message to the processing unit. The processing unit then appends the scene identification to the observation information, and sends the observation information with the scene identification to the observation system 320. For example, the processing unit sends observation information a with scene identification a and observation information b with scene identification b to the observation system 320.

The observation system 320 may include a message management module 321 and a scene management module 322. The message management module 321 may cluster messages according to the scene identification of the observation message, and organize the observation information of a same scenario together. The clustered observation messages are then sent to the scene management module 322.

The scene management module 322 may call a plurality of plug-ins, and each plug-in may process the observation information of a scenario. In an example, a first plug-in may be called to process the observation information a with the scene identification a (such as the summary observation information in the user usage scenario and the business observation scenario above). The processing of the observation information by the plug-in may include organizing the observation information a into JSON and outputting it to a corresponding storage position, such as a local position 330. In another example, a second plug-in may be called to process the observation information b with the scene identification b (such as the detailed observation information in the above strategy observation scenario). The processing of the observation information b by the plug-in may include outputting the observation information to the corresponding storage location, such as outputting to a remote data storage area 340, such as ElasticSearch, MySQL, etc. The processing may further include indexing the observation information.

In an example, the retrieval system 310 may, after receiving a control signal, adjust the processing strategy of the processing unit according to the control signal, thereby changing the process of processing the query request.

Figure 4:
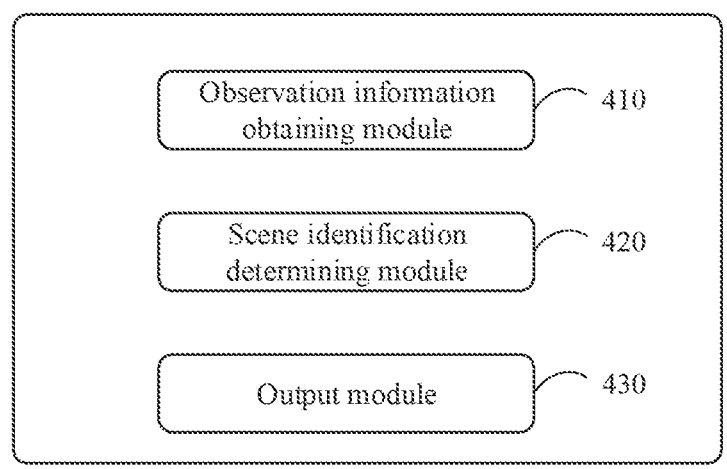
FIG. 4 is a schematic block diagram of an apparatus of processing an observation information according to an embodiment of the present disclosure.

FIG. 4 is a schematic block diagram of an apparatus of processing an observation information according to an embodiment of the present disclosure.

As shown in FIG. 4, the apparatus 400 of processing an observation information may include an observation information obtaining module 410, a scene identification determining module 420, and an output module 430.

The observation information obtaining module 410 is configured to obtain the observation information generated in a process of processing a query request. In one embodiment, the observation information obtaining module 410 may be configured to perform the operation S210 described above, which will not be repeated here.

The scene identification determining module 420 is configured to determine a scene identification corresponding to the observation information. In one embodiment, the scene identification determining module 420 may be configured to perform the operation S220 described above, which will not be repeated here.

The output module 430 is configured to output the observation information to a corresponding target position for storage according to the scene identification. In an embodiment, the output module 430 may be configured to perform the operation S230 described above, which will not be repeated here.

According to another embodiment of the present disclosure, the above apparatus of processing an observation information may also include an adjusting module configured to adjust, in response to the receiving a control signal, the process of processing a query request according to the control signal.

According to another embodiment of the present disclosure, the adjusting module includes at least one of a first adjusting sub-module, a second adjusting sub-module, a third adjusting sub-module, a fourth adjusting sub-module, a fifth adjusting sub-module and a sixth adjusting sub-module. The first adjusting sub-module is configured to adjust a word segmentation rule for the query request in a preprocessing stage. The second adjusting sub-module is configured to adjust a synonym conversion rule for the query request in the preprocessing stage. The third adjusting sub-module is configured to adjust a keyword matching rule in a recall stage. The fourth adjusting sub-module is configured to adjust an evaluation value calculation rule in a ranking stage. The fifth adjusting sub-module is configured to adjust a target call address of a predetermined module. The sixth adjusting sub-module is configured to adjust a timeout parameter.

According to another embodiment of the present disclosure, the output module includes a first output sub-module configured to output, in response of determining that the scene identification is a first scene identification, the observation information to a local position.

According to another embodiment of the present disclosure, the output module includes a second output sub-module configured to output, in response of determining that the scene identification is a second scene identification, the observation information to a remote data storage area.

According to another embodiment of the present disclosure, the above apparatus of processing an observation information may further include an index setting module configured to set an index for the observation information, so as to search data in the data storage area according to the index.

Collecting, storing, using, processing, transmitting, providing, and disclosing etc. of the personal information of the user involved in the present disclosure all comply with the relevant laws and regulations, are protected by essential security measures, and do not violate the public order and morals. According to the present disclosure, personal information of the user is acquired or collected after such acquirement or collection is authorized or permitted by the user.

According to the embodiment of the present disclosure, the present disclosure further provides an electronic device, a readable storage medium and a computer program product.

Figure 5:
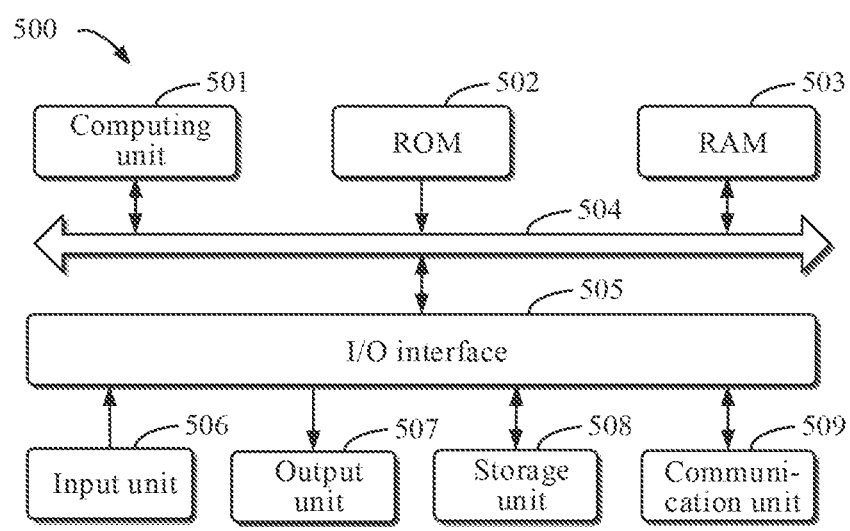
FIG. 5 is a block diagram of an electronic device for implementing a method of processing an observation infoimation of an embodiment of the present disclosure.

FIG. 5 shows a block diagram of an electronic device of another embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the electronic device 500 may include computing unit 501, which may perform various appropriate actions and processing based on a computer program stored in a read-only memory (ROM) 502 or a computer program loaded from a storage unit 508 into a random access memory (RAM) 503. Various programs and data required for the operation of the electronic device 500 may be stored in the RAM 503. The computing unit 501, the ROM 502 and the RAM 503 are connected to each other through a bus 504. An input/output (PO) interface 505 is further connected to the bus 504.

I/O interface 505 are connected to various components in the electronic device 500, including an input unit 506, such as a keyboard, a mouse, etc.; an output unit 507, such as various types of displays, speakers, etc.; a storage unit 508, such as a magnetic disk, an optical disk, etc.; and a communication unit 509, such as a network card, a modem, a wireless communication transceiver, etc. The communication unit 509 allows the electronic device 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 501 may perform the various methods and processes described above, such as the method of processing an observation information. For example, in some embodiments, the method of processing an observation information may be implemented as a computer software program that is tangibly contained on a machine-readable medium, such as a storage unit 508. In some embodiments, part or all of a computer program may be loaded and/or installed on the electronic device 500 via the ROM 502 and/or the communication unit 509. When the computer program is loaded into the RAM 503 and executed by the computing unit 501, one or more steps of the method of processing an observation information described above may be performed. Alternatively, in other embodiments, the computing unit 501 may be configured to perform the method of processing an observation information in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose progammable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an observation information, comprising:
    obtaining a plurality of observation information generated by a retrieval system in a process of processing each of a plurality of query requests in different scenes, wherein each observation information is used to record a processing result for a respective one of the plurality of query requests;
    determining a scene identification corresponding to each observation information based on a mapping relationship between the scene identification and the observation information, wherein the scene identification is a first scene identification indicating that the scene corresponding to the observation information is a first scene, or a second scene identification indicating that the scene corresponding to the observation information is a second scene, wherein the observation information in the first scene has smaller amount of data than the observation information in the second scene;
    appending respective scene identification to each observation information;
    clustering the plurality of observation information by scene according to the scene identifications of the plurality of observation information;
    outputting the observation information to a local position, in response of determining that the scene identification is a first scene identification; and
    outputting the observation information to a remote data storage area, in response of determining that the scene identification is a second scene identification.

2. The method of claim 1, further comprising:
    in response to receiving a control signal, adjusting the process of processing the query request according to the control signal.

3. The method of claim 2, wherein the adjusting the process of processing the query request according to the control signal comprises at least one of:
    adjusting a word segmentation rule for the query request in a preprocessing stage;
    adjusting a synonym conversion rule for the query request in the preprocessing stage;
    adjusting a keyword matching rule in a recall stage;
    adjusting an evaluation value calculation rule in a ranking stage;
    adjusting a target call address of a predetermined module; and
    adjusting a timeout parameter.

4. The method of claim 1, further comprising:
    setting an index for the observation information, so as to search data in the data storage area according to the index.

5. An electronic device, comprising:
    at least one processor; and
    a memory communicatively coupled with the at least one processor;
    wherein the memory stores instructions executable by the at least one processor, and the instructions, when executed by the at least one processor, cause the at least one processor to implement the method of claim 1.

6. The electronic device of claim 5, wherein the at least one processor is further configured to:
    in response to receiving a control signal, adjust the process of processing the query request according to the control signal.

7. The electronic device of claim 6, wherein the at least one processor is further configured to perform at least one of:

adjusting a word segmentation rule for the query request in a preprocessing stage;
adjusting a synonym conversion rule for the query request in the preprocessing stage;
adjusting a keyword matching rule in a recall stage;
adjusting an evaluation value calculation rule in a ranking stage;
adjusting a target call address of a predetermined module; and
adjusting a timeout parameter.

8. The electronic device of claim 5, wherein the at least one processor is further configured to:
set an index for the observation information, so as to search data in the data storage area according to the index.

9. A non-transitory computer readable storage medium storing computer instructions, wherein the computer instructions are configured to cause a computer to implement the method of claim 1.

10. The storage medium of claim 9, wherein the computer instructions are further configured to cause a computer to:
in response to receiving a control signal, adjust the process of processing the query request according to the control signal.

11. The storage medium of claim 10, wherein the computer instructions are further configured to cause a computer to perform at least one of:
adjusting a word segmentation rule for the query request in a preprocessing stage;
adjusting a synonym conversion rule for the query request in the preprocessing stage;
adjusting a keyword matching rule in a recall stage;
adjusting an evaluation value calculation rule in a ranking stage;
adjusting a target call address of a predetermined module; and
adjusting a timeout parameter.

12. The method of claim 1, wherein the scene identification corresponding to the observation information indicates whether the observation information has a larger amount of data or a smaller amount of data, compared with a predetermined value.

13. The method of claim 1, wherein the scene identification corresponding to the observation information indicates whether the observation information is stored at a local position or a remote data storage area.

* * * * *